Sept. 28, 1937. E. L. BURLEY 2,094,261
BANDIT PROTECTIVE DEVICE FOR AUTOMOBILES
Filed Jan. 11, 1935
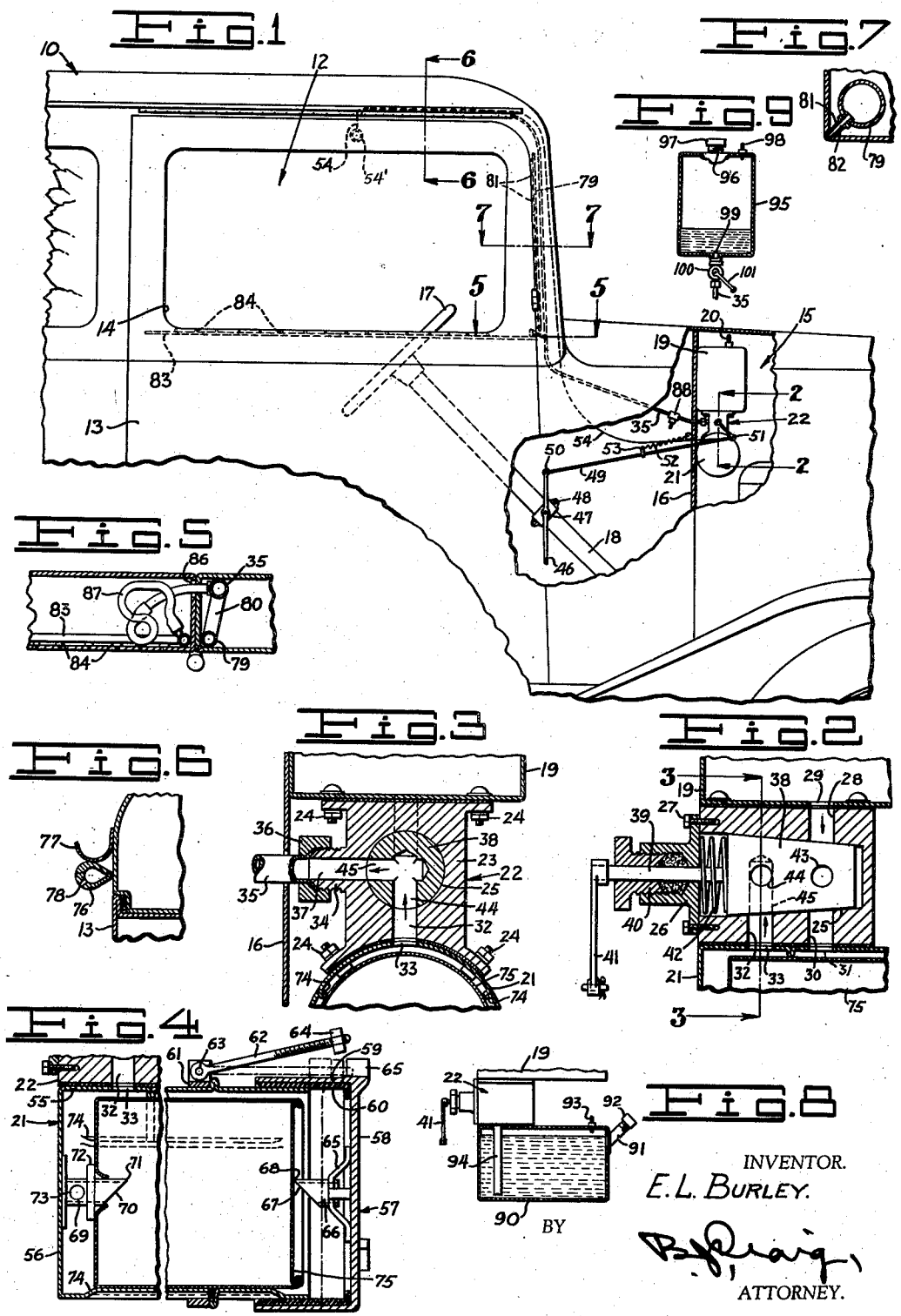
INVENTOR.
E. L. BURLEY.
BY
ATTORNEY.

Patented Sept. 28, 1937

2,094,261

UNITED STATES PATENT OFFICE 2,094,261

BANDIT PROTECTIVE DEVICE FOR AUTOMOBILES

Ernest L. Burley, Pasadena, Calif.

Application January 11, 1935, Serial No. 1,369

3 Claims. (Cl. 299—30)

This invention relates to bandit protective devices for automobiles.

The general object of the invention is to provide an automobile or other vehicle with novel means for repelling an attack by bandits.

Another object of the invention is to provide means on an automobile whereby the operator may discharge a quantity of fluid or gas at a bandit when the bandit approaches the car.

A further object of the invention is to provide improved means for storing and discharging fluid for the purpose described.

Other objects and the advantages of this invention will be apparent from the following description taken in connection with the accompanying drawing wherein:

Fig. 1 is a fragmentary side elevation of an automobile with a protection device embodying the features of my invention;

Fig. 2 is an enlarged section taken on line 2—2 of Fig. 1;

Fig. 3 is a section taken on line 3—3 of Fig. 2;

Fig. 4 is an enlarged fragmentary central longitudinal section through the gas storage tank;

Fig. 5 is an enlarged fragmentary section taken on line 5—5 of Fig. 1;

Fig. 6 is an enlarged fragmentary section taken on line 6—6 of Fig. 1;

Fig. 7 is an enlarged fragmentary section taken on line 7—7 of Fig. 1;

Fig. 8 is a detail section of a liquid container for use in combination with my device; and, Fig. 9 is a detail section of a modified form of liquid container for use in combination with my system.

Referring to the drawing by reference characters I have indicated an automobile generally at 10. As shown the automobile 10 includes the usual driver's compartment 12 having a door 13 in which there is a window 14. The automobile 10 further includes an engine compartment 15 and a partition 16 separating the driver's compartment from the engine compartment. Furthermore, the usual steering wheel 17 and supporting column 18 therefor are located in the driver's compartment 12.

Mounted on the partition 16 in the engine compartment I provide an air tank 19 which includes a tire valve 20 for admitting air under pressure into the tank.

Mounted on the partition 16 in the engine compartment below the air tank 19 I provide a gas tank 21. Positioned between the tanks 19 and 21 I provide a control valve 22, Fig. 3, which includes a body portion 23 which is secured to the tanks 19 and 21 by bolts and nuts 24. The body 23 has a frusto-conical recess 25 therein and for closing the recess 25 I provide a cap member 26, Fig. 2, which is secured to the body 23 by bolts 27. The body 23 has an air inlet aperture 28 therein which at one end communicates with the conical recess 25 and at the opposite end communicates with an air outlet aperture 29 in the air tank 19.

Opposite the inlet 28 the body 23 has an air outlet aperture 30 therein which at one end communicates with the conical recess 25 and at the opposite end communicates with an air inlet aperture 31 in the gas tank 21. At one side of the apertures 28 and 30 the body 23 has a gas inlet aperture 32 therein which at one end communicates with the conical recess 25 and at the opposite end communicates with a gas outlet aperture 33 in the gas tank 21. The body 23 has a threaded coupling boss 34 extending from one side thereof to which a conduit 35 is connected by a coupling nut 36. The body 23 furthermore has a gas outlet aperture 37 therein which is positioned at right angles to the gas inlet aperture 32 and at one end communicates with the conical recess 25 and at the opposite end opens into the conduit 35.

Positioned in the conical recess 25 I provide a frusto-conical valve plug 38 which is rotatable in the recess 25 and includes a reduced operating stem 39 which passes through a packing gland 40 in the cap 26 and has an operating arm 41 secured thereto. Positioned in the recess 25 between the cap 26 and the adjacent end of the valve plug 38 I provide a coiled spring 42 which normally urges the valve plug towards the small end of the recess.

The valve plug 38 has an air conduit aperture 43 therethrough in line with the body aperture 28 and 30 and in line with the body apertures 32 and 37 the valve plug has a pair of communicating recesses 44 and 45 therein which are positioned at right angles to each other.

When the valve 22 is in an open position the plug aperture 43 communicates with both the body apertures 28 and 31 to afford free passageway through the valve from the air tank to the gas tank. At the same time the plug recess 44 communicates with the body aperture 32 and the recess 45 communicates with the body aperture 37 to afford free passageway through the valve from the gas tank to the conduit 35 as shown in Fig. 3.

When the valve 22 is closed as shown in Fig. 2 the valve plug aperture 43 is out of communication with the body apertures 28 and 30 thereby restricting passageway through the valve body from the air tank to the gas tank and the valve plug recess 45 is out of communication with the body aperture 37 thereby restricting free passage from the gas tank to the conduit 35.

For operating the valve 22 I provide a lever 46 which is pivoted intermediate its length as at 47 on a bracket 48 which is shown as mounted on the steering wheel post 18. One end of a rod 49 is pivotally connected as at 50 to the upper end of the lever 46 and the opposite end of the rod is connected as at 51 to the valve operating arm 41.

A coiled spring 52 which is anchored at one end to the portion 16 and secured to the rod 49 as at 53 normally retains the valve arm 41 in a position wherein the valve 27 is in a closed position.

Also for operating the valve to an open position I may provide a cord or flexible wire 54 which is similar to a choke wire and which at one end may be connected to the valve arm 41 and extends into the driver's compartment 12 where it depends from the ceiling and terminates in a finger loop 54'.

As shown in Fig. 4 the gas tank 21 is cylindrical in cross section and includes side walls 55 and an end wall 56, the opposite end being open. The open end of the gas tank is adapted to be closed by a cap 57 which includes an end wall 58 and a circular skirt 59. Positioned in the cap 57 abutting the skirt 59 I provide a rubber gasket 60. The skirt portion 59 of the cap and the gasket 60 fit over the outer surface of the gas tank.

Mounted on and secured to the gas tank as by welding I provide a ring 61 on which a plurality of bolts 62 are pivotally mounted as at 63 and on the bolts I provide suitable nuts 64.

When the cap 58 is entirely positioned on the gas tank the bolts 62 are positioned in slotted bosses 65 on the cap and the nuts are screwed up against the bosses to securely clamp the cap to the gas tank. Mounted on the end wall 58 of the cap 57 I provide a bracket 65 which supports a hollow tube 66 which is bevelled as at 67 to form a sharp pointed edge 68.

Mounted on the end wall 56 of the gas tank 21 I provide a hollow tube 69 which like the tube 66 is bevelled as at 70 to form a sharp pointed edge 71. Intermediate its length the tube 69 has a collar 72 thereon and intermediate the collar and the end wall the tube 69 has a transverse aperture 73 therethrough. Further the gas tank 21 has a plurality of inwardly extending longitudinal ribs 74.

In operation a closed container 75 which contains a gas such as tear gas under low pressure is inserted into the gas tank 21 until the end thereof engages the tube 69 and then the cap 57 is positioned on the end of the gas tank and moved towards the container 75 until the tube 67 engages the end of the container. Upon further movement of the cap towards the container the bevelled end of the tube 69 and the bevelled end of the tube 66 will cut through the ends of the container whereupon the gas in the container 75 flows through the tubes 66 and 69 into the gas tank 21. After the container 75 has been punctured the cap 57 is firmly secured to the gas tank by the bolts 62, as previously described.

As shown in Fig. 1 the conduit 35 extends rearward from the valve 22 and is positioned in the side wall of the automobile where it extends upward adjacent the door 13 to a position thereabove where it communicates with a discharge tube 76. The discharge tube 76 is mounted on the outside of the automobile body between the upper edge of the door 13 and the trough 77 which is sometimes provided to conduct water away from the door. As shown in Fig. 6 the tube 76 is preferably tear-drop shape with the large portion thereof positioned away from the automobile body. The wall of the tube 76 is of greater thickness at the large portion of the tube and has a plurality of discharge apertures 78 therein.

Adjacent the conduit 35 and the forward edge of the door 13 between the side wall of the automobile I provide a tube 79 which communicates with the conduits 35 through a portion 80 (see Figs. 5 and 7). The tube 79 has a plurality of discharge nozzles 81 thereon each of which has an aperture 82 therein communicating with the interior of the tube (see Fig. 7). The ends of the nozzles 81 extend through the side wall of the automobile and are directed outward and rearward towards the door 13.

In the door 13 adjacent the lower edge of the window 12 I provide a tube 83 having nozzles 84 thereon similar to the tube 79 and nozzles 81. The ends of the nozzles 84 of the tube 83 extend through the side wall of the door 13 and are directed outward and upward.

Mounted on the tube 35 I provide an arcuate tube 85 which communicates with the interior of the tube 35 and extends through an aperture 86 into the door 13 where one end of a flexible tube 87 is connected thereto. The opposite end of the flexible tube 87 is connected to the tube 83.

Interposed in the conduit 35 adjacent the valve 22 I provide a tire valve member 88.

In operation when a bandit approaches the door 13 the operator of the automobile 10 swings the lever 46 about its pivot 47 by means of his foot. As the lever 46 is thus rocked it moves the rod 49 against the action of the spring 52 and swings the valve arm 41 to a position wherein the valve 22 is opened as previously described. Or if the operator is commanded to put up his hands he may pull the cord 54 which will swing the valve arm 41 to a position wherein the valve 22 is opened. When the valve 22 is opened the highly compressed air in the air tank 19 flows into the gas tank 21, as previously described, thereby increasing the pressure in the gas tank and forcing the gas in the gas tank out and into the conduit 35, as previously described. The gas then flows through the conduits 35 into the tubes 76, 79, and 83.

From the tube 76 the gas is discharged through the apertures 78 which are preferably arranged at various angles to direct the gas over the greatest possible area. From the tube 79 the gas is discharged through the nozzles 81 and from the tube 83 the gas is discharged from the nozzles 84. When the bandit retreats from the gas attack the operator releases the lever 46 on the cord 54 whereupon the spring 52 moves the rod and the valve arm 41 to their normal positions wherein the valve 22 is closed.

After discharging a quantity of gas the operator preferably drives into a service station where a tire inflating air hose is connected to the valve 88 to admit compressed air to the conduit 35 to blow out any gas which may be in the conduit 35 or the tubes 76, 79, and 83.

In Fig. 8 I have shown a liquid tank 90 which may be used in place of the gas tank 21. The tank 90 includes a filling spout 91 which is securely closed by a cap 92 threaded thereon and in the top of the tank I preferably provide a tire valve 93 which after the tank is used, but its contents not completely discharged, may be used to relieve pressure to the tank 90.

When the tank 90 is used a tube 94 is provided one end of which communicates with the inlet aperture 32 in the valve body 23 and the opposite end of the tube is positioned a slight distance above the bottom of the tank.

When the valve 22 is operated to an open position compressed air from the air tank 19 flows into the tank 90 and forces the liquid therein up through the tube 94 and into the conduit 35 and thence into the tubes 76, 79, and 83.

In Fig. 9 I have shown a different type of liquid tank 95 which may be used instead of the air tank 19 and the gas tank 21. The tank 95 includes a filling spout 96 which is securely closed by a cap 97 threaded thereon and in the top of the tank I provide a tire valve 98. The bottom of the tank 95 has a discharge aperture 99 therein which communicates with a shut-off valve 100 which in turn communicates with the conduit 35. The valve 100 includes an operating arm 101 to which the rod 49 is connected.

In operation the tank 95 is approximately one-third filled with a liquid such as ammonia and then air under pressure is admitted into the tank through the tire valve 98. When the operator actuates the valve arm 101 to open the valve 100 the compressed air in the tank 95 forces the liquid therefrom into the conduit 35 and thence into the tubes 76, 79, and 83.

From the foregoing description it will be apparent that I have provided a novel bandit repelling device for automobiles which is simple in construction, easy to operate and highly efficient in use.

Having thus described my invention, I claim:

1. The combination of a vehicle having an engine thereon for propelling the same, said vehicle having a door frame, a conduit having a plurality of discharge apertures and arranged in said frame about said door, said discharge apertures being directed outwardly from said vehicle, a fluid container on said vehicle, said fluid container having a filling aperture, said conduit being connected to said container, said conduit having a shut-off valve, said container and said conduit being independent of and out of communication with the propelling means of said vehicle.

2. The combination of a vehicle having an engine thereon for propelling the same, said vehicle having a door frame, a conduit having a plurality of discharge apertures and arranged in said frame about said door, said discharge apertures being directed outwardly from said vehicle, a fluid container on said vehicle, said fluid container being arranged below said conduit discharge apertures, said container having a filling aperture, means connecting said conduit to said container, said connecting means including a valve, said valve being disposed below said conduit discharge apertures, said container and said conduit being independent of and out of communication with the propelling means of said vehicle.

3. The combination of a vehicle having an engine thereon for propelling the same, said vehicle having a door, a conduit arranged in said door, said conduit having a plurality of discharge apertures, said discharge apertures being directed outwardly from said vehicle and a fluid container, said fluid container being independent of the propelling means of said vehicle, said fluid container having a valve whereby fluid under pressure may be introduced and stored, a second conduit on said vehicle, said second conduit being connected to said fluid container and having a shut-off valve therein and a flexible fluid tight conduit connecting said conduits.

ERNEST L. BURLEY.